United States Patent [19]

Doin et al.

[11] Patent Number: 5,380,770

[45] Date of Patent: Jan. 10, 1995

[54] HEAT CURED SILICONE RUBBER COMPOSITIONS CONTAINING A POTASSIUM ALUMINOSILICATE FILLER WHICH PROVIDES RESISTANCE TO HYDROCARBON OILS AND ADJUSTABLE SHRINKAGE

[75] Inventors: James E. Doin, Hoosick Falls; Edwin R. Evans, Clifton Park, both of N.Y.

[73] Assignee: General Electric Company, Waterford, N.Y.

[21] Appl. No.: 865,546

[22] Filed: Apr. 9, 1992

[51] Int. Cl.$^6$ .................. C08K 9/06; C08K 3/34; C08L 83/00
[52] U.S. Cl. .................. 523/212; 524/588; 524/449; 524/492
[58] Field of Search .......... 524/588, 449, 492; 523/212

[56] References Cited

U.S. PATENT DOCUMENTS

| | | | |
|---|---|---|---|
| 4,355,121 | 10/1982 | Evans | 523/213 |
| 4,400,485 | 8/1983 | Mukamal et al. | 524/444 |
| 4,492,786 | 1/1985 | Evans et al. | 524/865 |
| 4,529,774 | 7/1985 | Evans et al. | 524/860 |
| 4,552,689 | 11/1985 | Yui et al. | 252/511 |
| 4,585,848 | 4/1986 | Evans et al. | 528/15 |
| 4,701,491 | 10/1987 | Lamont et al. | 524/588 |
| 4,720,530 | 1/1988 | Würminghausen et al. | 524/588 |
| 4,721,766 | 1/1988 | Inoue et al. | 524/588 |
| 4,724,167 | 2/1988 | Evans et al. | 427/221 |
| 4,742,145 | 5/1988 | Saito et al. | 524/588 |
| 4,800,124 | 1/1989 | Davis et al. | 524/588 |
| 4,968,726 | 11/1990 | Thorsrud | 523/137 |
| 4,994,518 | 2/1991 | Morin et al. | 524/449 |
| 5,032,626 | 7/1991 | Evans | 523/207 |
| 5,036,118 | 7/1991 | Martinez | 523/212 |
| 5,122,562 | 6/1992 | Jeram et al. | 524/588 |
| 5,132,340 | 7/1992 | Evans et al. | 524/588 |

FOREIGN PATENT DOCUMENTS

| | | |
|---|---|---|
| 0477681 | 4/1992 | European Pat. Off. . |
| 0520777 | 12/1992 | European Pat. Off. . |
| 2060667 | 5/1981 | United Kingdom . |
| 2192401 | 1/1988 | United Kingdom . |
| 2249552 | 5/1992 | United Kingdom . |

*Primary Examiner*—Melvyn I. Marquis
*Assistant Examiner*—Karen A. Dean

[57] ABSTRACT

Heat cured silicone rubber compositions which contain a potassium aluminosilicate filler exhibit improved resistance to hydrocarbon oils. The potassium aluminosilicate filler has an average surface area of between about 5.0 and about 6.50 m$^2$/g, an average particle diameter of between about 1.0 and about 20.0 micrometers, and an average particle thickness of between about 0.5 and 1.0 micrometers. The filler improves retention of physical properties and resistance to swelling in hot hydrocarbon oils in a wide variety of siloxane compositions.

29 Claims, No Drawings

HEAT CURED SILICONE RUBBER COMPOSITIONS CONTAINING A POTASSIUM ALUMINOSILICATE FILLER WHICH PROVIDES RESISTANCE TO HYDROCARBON OILS AND ADJUSTABLE SHRINKAGE

FIELD OF THE INVENTION

The present invention relates to heat cured silicone rubber compositions having improved resistance to shrinkage and hydrocarbon oils. More particularly, the invention relates to heat cured silicone rubber compositions exhibiting improved resistance to hydrocarbon oils. The compositions contain a potassium aluminosilicate filler having a specific surface area, particle diameter, and particle thickness.

BACKGROUND OF THE INVENTION

Heat curable silicone rubber compositions are known for their ability to resist change at elevated temperature and exposure to adverse conditions over extended periods of time. Silicone rubber compositions for use in gasketing applications require good tear and tensile strength and reduced compression set properties.

Heat cured silicone rubber compositions used in automotive gasketing applications must also have a strong resistance to hydrocarbon oils, especially at high temperatures.

Silicone rubber compositions, like most elastomeric materials, tend to shrink as a function of temperature and the thermal expansion of the material. Shrinkage is also dependent upon chemical change and the loss of volatiles during curing. Different combinations of polymers, fillers and molding temperatures are used in attempts to control the degree of shrinkage.

A cured product should have the same dimensions as its mold when both are at a curing temperature. The part, however, shrinks upon cooling. It is difficult to precisely adjust the formulation of the elastomeric material such that the optimum combination of properties and shrinkage is provided. The cost associated with manufacturing a mold which provides acceptable measured tolerances of cured parts is high. A convenient and beneficial additive to adjust shrinkage is thus desirable.

Although heat curable silicone rubber compositions having good tear strength, tensile strength and low compression set properties are known in the art, compositions for use in various automotive gasketing applications currently lack a combination of these properties along with excellent oil resistance and adjustable shrinkage. It is desirable to provide heat cured silicone elastomer compositions having the properties and durability that enable their use in various automotive gasketing applications.

SUMMARY OF THE INVENTION

The present invention is based upon the discovery that a better balance of properties necessary for a composition used in automotive gasketing applications can be achieved by adding a potassium aluminosilicate filler to a heat curable silicone rubber elastomer.

According to the present invention, compositions can be produced which, upon heat curing, exhibit excellent oil resistance properties. The filler may be used in siloxane compositions which may contain an MQ resin component. The present invention can be exemplified, but should in no way be considered limited to, the following compositions which are instructive in the use of potassium aluminosilicate fillers for achieving excellent resistance to hydrocarbon oils.

A potassium aluminosilicate filler is added to a blend comprising at least one organopolysiloxane gum, an optional MQ or M D-vinyl Q resin or blends thereof, a silica filler, an optional vinyl-on-chain siloxane gum, and an organohydrogensiloxane cross-linking agent. The mixture produces a silicone elastomer which is heat curable in the presence of a catalyst.

In one group of compositions, blends are formulated which comprise 100 parts by weight of a polymer system. The polymer system comprises at least one diorganopolysiloxane having a viscosity of about 3,000,000 to about 100,000,000 centipoise (cps) at 25° C., herein described as Components (A)–(D), and up to 30 parts by weight, based on 100 parts by weight of the at least one diorganopolysiloxane gum, of an MQ or M D-vinyl Q resin copolymer or resin copolymer blend, Component (F).

The organopolysiloxane gum Components (A)–(D) may be used in various combinations or separately. The gum or gums should each have a viscosity of up to about 100,000,000 cps at 25° C. More preferably, gum components are used which have viscosities of from about 3,000,000 to about 100,000,000 cps at 25° C.

The gum or gums may be (A) free of vinyl groups, (B) vinyl-stopped, (C) have vinyl-on-chain, or (D) have both vinyl end stops and vinyl-on-chain. For purposes of clarification, Components (A)–(D) will be explained in greater detail below. The polymer systems of the compositions of the present invention are defined as 100 parts by weight. Any of the polymers (A)–(D) may make up the entire weight of the polymer system, a portion of the entire weight, or may be completely absent from the polymer system. The polymer system also includes the resin, Component (F), if used.

Up to 100 parts by weight of the polymer system may be Component (A), an organopolysiloxane substantially free of vinyl and having a viscosity of from abut 3,000,000 to about 100,000,000 cps at 25° C. Alternatively, Component (A) can comprise a mixture of such organopolysiloxanes.

Up to 100 parts by weight of the polymer system may be Component (B), a vinyl chain-stopped organopolysiloxane, substantially free of vinyl-on-chain, having a viscosity of from about 3,000,000 to about 100,000,000 cps at 25° C. Alternatively, Component (B) can comprise a mixture of such organopolysiloxanes.

Up to about 100 parts by weight of the polymer system may be Component (C), a vinyl-on-chain organopolysiloxane, free of vinyl chain stops, having a vinyl content of about $5 \times 10^{-3}$ to about 5 weight percent and a viscosity of from about 3,000,000 to about 100,000,000 cps at 25° C. Alternatively, Component (C) may comprise mixtures of such organopolysiloxanes.

Up to about 100 parts by weight of the polymer system may be Component (D), a vinyl chain-stopped, vinyl-on-chain organopolysiloxane having a vinyl content of about $1 \times 10^{-3}$ to about 5 weight percent. Alternatively, Component (D) may comprise mixtures of such organopolysiloxanes. Component (D) preferably has a vinyl content of about 0.001 weight percent or higher and is present in an amount of between about 0.1 and about 100 percent of the polymer system.

The resin copolymer (F) may comprise (1) $R_3SiO_{\frac{1}{2}}$ monofunctional units (M units) and $SiO_2$ quadri-functional units (Q units), where each R is independently selected from the group consisting of vinyl radicals and monovalent hydrocarbon radicals free of aliphatic unsaturation. The ratio of M units to Q units ranges from about 0.5:1 to about 1.5:1, wherein about 0.5 to about 10.0 weight percent are vinyl groups.

Alternatively, the organopolysiloxane resin, Component (F), may comprise (2) an organopolysiloxane resin copolymer containing M and Q units as aforesaid and $R_2SiO_{2/2}$ difunctional (D units) where each R is independently selected from the group consisting of vinyl radicals and monovalent hydrocarbon radicals free of aliphatic unsaturation. Each M unit may represent M or M' e.g. M-vinyl units, and each D unit may represent D or D' e.g. D-vinyl units. The ratio of M units to Q units is from 0.5:1 to about 1.5:1 and the D units are present in an amount of from about 1 to 70 mol percent based upon the total number of mols of siloxy units in the copolymer. The resinous copolymer contains from about 0.5 to about 10.0 weight percent vinyl groups. The organopolysiloxane resin copolymer may contain mixtures of the MQ and the M D-vinyl Q, resins.

In addition to the exemplary polymer system made up of components (A)-(D) and (F), and based upon 100 parts by weight of the polymer system, the compositions of the present invention also contain:

(G) from about 1 to about 50 parts by weight, based upon the polymer system, of a potassium aluminosilicate filler having a laminar structure, a surface area of between about 5.0 and about 6.50 square meters per gram, an average particle diameter of from about 1.0 to about 20.0 micrometers, and an average particle thickness of from about 0.5 to about 1.0 micrometers;

(H) up to about 200 parts based upon the polymer system of a finely divided filler wherein the finely divided filler is preferably silica filler;

(I) up to about 100 parts based upon the polymer system of a vinyl-stopped, vinyl-on-chain polymer having from about $5 \times 10^{-3}$ to about 5 weight percent vinyl; and (J) a random copolymer formed of a polydimethyl siloxane (PDMS) and a polymethyl hydrogen siloxane (PMHS) having the form:

$$R_3SiO(SiORHSiOR_2)_xSiR_3$$

wherein each R is independently chosen from a hydrogen or monovalent hydrocarbon radical free of aliphatic unsaturation containing 1 to about 8 carbon atoms, and x ranges from about 2 to about 100. In the present invention, the hydride is present in an amount ranging from about 0.1 to 10 parts by weight based on the polymer system, preferably 0.5 to 8, and more preferably 0.8 to 2.5 parts by weight. When a hydride agent is employed, a platinum catalyst may be substituted for the peroxide catalyst to cure the composition. In Component (J) x may vary so that (J) has a viscosity ranging from about 5 to 500 cps, preferably from about 10 to about 100 cps and more preferably from about 10 to 50 cps at 25° C.

In order to improve properties or processing, the composition may also contain:

(K) up to about 2 parts by weight of a tetramethyldivinyl silazane based upon the polymer system; and (L) up to about 10 parts by weight based upon the polymer system of a processing aid comprising low viscosity silanol stopped siloxane fluid of from about 3 to about 500 centipoise at 25° C., or a dimethyl trimethoxy siloxane polymer, or similar compositions such as silanol or methoxy fluids of other viscosities.

Additionally, a cyclic methyl tetramer at about 15 to about 20 percent by weight based upon the weight of the filler (H) may be used to treat the filler (H) prior to compounding.

A small amount of water may also be added to increase the processibility of the blend. If used, only up to about 0.1 parts by weight water based on the polymer system is usually employed.

In addition to the foregoing, a heat aging Component (M) such as fumed $TiO_2$, iron octoate, $Ce(OH)_4$, or mixtures thereof, may be present in relatively small amounts, e.g., up to 2 parts by weight based upon the polymer system. In the examples below the heat aging component consists of 33 weight percent $TiO_2$, 5 weight percent iron octoate solution (which comprises about 12 weight percent iron in mineral spirits), 10 weight percent treated fumed silica (160 m²/g), and 50 weight percent of an 800 penetration vinyl-stopped, vinyl-on-chain gum.

An acid acceptor, Component (N), may also be added to soak up acid. This acid could otherwise cause cleavage of the product matrix. In one embodiment, (N) comprises a masterbatch of about 25% MgO in a vinyl siloxane polymer.

The heat curable compositions of the present invention provide heat cured silicone elastomers having good shrinkage and oil resistance. These properties are exhibited throughout extended periods of use at high temperatures making these compositions useful in automotive gasketing applications.

DESCRIPTION OF THE INVENTION

The compositions of the present invention contain 100 parts by weight of a polymer system made up of:

a polydiorganosiloxane gum having a viscosity of about 3,000,000 to 100,000,000 cps at 25° C. or blends of such gums, some or all of which may be vinyl-containing, described herein as Components (A)-(D);

and (F) an optional organopolysiloxane resin of the MQ or M D-vinyl Q types.

In addition to the exemplary polymer system made up of Components (A)-(D) and (F), the compositions of the present invention also contain:

(G) a potassium aluminosilicate filler having a laminar structure; (H) a finely divided silica filler; (I) an optional vinyl-on-chain siloxane gum; and (J) an organohydrogensiloxane cross-linking agent. Combinations of various other components as described herein may also be added.

Component (G) is a potassium aluminosilicate filler having a laminar structure. The filler is mixed with a siloxane composition in amounts from about 1 to about 50 parts by weight based on total weight of Components (A)-(L) described herein. Preferably, the filler is added in an amount between about 10 and about 40 parts by weight, more preferably from about 15 to about 30. The filler has a specific surface area of from about 5.0 to about 6.50, preferably from about 5.05 to about 6.2, and most preferably from about 5.07 to about 6.11 m²/g. The potassium aluminosilicate filler has an average particle diameter of from about 1.0 to about 20.0, preferably from about 1.0 to about 10, and most preferably from about 1.0 to about 5.0 micrometers. The average particle thickness of the filler is from about 0.5 to about 1.0, preferably from about 0.45 to about 0.8, and most preferably from about 0.45 to about 0.55, micrometers.

The surface area of the potassium aluminosilicate filler is important to the present invention because a surface area which is too large will lead to an increase in the durometer of the final cured product, an increase in modulus, and a decrease in elongation. On the other hand, a surface area which is too small will lead to a decrease in the durometer of the final cured product, a decrease in modulus, an increase in elongation and a decrease in tear properties.

The average particle size in the potassium aluminosilicate filler is also important because if the average particle size is too large, the permeability and swell properties of the final cured product increase and it becomes more difficult to control the shrinkage of the cured product. If the particle size is too small, the modulus of the cured product increases, which makes the curable composition harder to work with and causes it to crumble easily.

In addition, the amount of potassium aluminosilicate is important because if an insufficient amount is used, there will be no significant improvement in resistance to hydrocarbon oils or reduction in the shrinkage of the final cured product.

The most preferred potassium aluminosilicate filler for use herein is potassium mica (also known as muscovite), having the formula $KAl_2(AlSi_3O_{10})(OH)_2$, which is a natural hydrous potassium aluminum silicate of the mica group. Another acceptable potassium aluminosilicate filler (G) has the formula $KAl_2(AlSi_3O_{10})(F)_2$. Mica of the formula $KH_2Al_2(SiO_4)_3$ is also expected to improve shrinkage and oil resistance if used according to the present invention.

The potassium aluminosilicate fillers used in the compositions of this invention have a highly laminar flake structure. The micronized muscovite micas are preferred over the wet ground muscovites due to the former's smaller average particle size. The laminar structure of the mica helps to create a uniform layered structure to minimize pores in the cured matrix. This leads to lower compression set, reduced permeation of gases and liquids, and a lower degree of shrinkage of the cured final product.

Potassium aluminosilicate compounds are known in the art and can be obtained commercially.

The polymer system comprises a diorganosiloxane gum or blend of such gums, each of which has a viscosity from about 3,000,000 to about 100,000,000 cps at 25° C. Preferably, the gums each have a viscosity of between about 7,000,000 and 84,000,000 cps, more preferably, about 13,000,000 cps at 25° C. One exemplary gum is a vinyl-stopped gum having substantially no vinyl-on-chain, described above as Component (B). The organo groups in the gum should all be monovalent hydrocarbon radicals. Gums may also be used which have a weight percent vinyl concentration of from about $5 \times 10^{-3}$ to about 1. More preferable gums have a weight percent vinyl concentration in the range from about $6.5 \times 10^{-3}$ to about 0.03, more preferably from about $8 \times 10^{-3}$ to about $1.5 \times 10^{-2}$ and more preferably yet from about $8 \times 10^{-3}$ to about $1.2 \times 10^{-2}$. The organo groups in the vinyl polymer or polymers of such gums should all be monovalent hydrocarbon radicals.

In a preferred embodiment, at least one gum of the polymer system is Component (B), and preferably has the structure:

$$ViSiOR^1{}_2 (SiOR^1{}_2)_x(SiOR^2{}_2)_y SiR^1{}_2Vi;$$

wherein Vi is vinyl and each $R^1$ is independently chosen from monovalent hydrocarbon free radicals free of aliphatic unsaturation and containing 1 to about 8 carbon atoms; each $R^2$ is independently chosen from monovalent hydrocarbon radicals containing 1 to about 8 carbon atoms; and x and y are integers chosen such that the viscosity is about 3,000,000 to about 100,000,000 cps at 25°. In other preferred embodiments, x and y are integers chosen such that Component (B) has a viscosity which ranges from about 3,000,000 to about 85,000,000 cps at 25° C. and a weight percent vinyl concentration in the range from about $5 \times 10^{-3}$ to about $2 \times 10^{-2}$, preferably from about $8 \times 10^{-3}$ to about $1.5 \times 10^{-2}$ and more preferably from about $8.0 \times 10^{-3}$ to about $1.2 \times 10^{-2}$.

Like viscosity, penetration is another way of classifying elastomeric materials. Penetration is measured using Universal Penetrometer by Precision Scientific Model No. 73510 with a substantially air free sample. The sample penetration is measured at 25° C.±1° C. using a 100 g weight and a ¼" diameter by 3/16" needle foot with rounded edges. The needle is lowered until it just touches the surface of the polymer. Then, the time to achieve up to 300 mm penetration is determined or the amount of penetration after 60 sec. Penetration gum is defined as:

$$\frac{\text{Depth of Penetration}}{\text{Time}} \times 60 \text{ sec. at } 25° \text{ C.}$$

Penetration may be controlled by controlling the molecular weight and the viscosity of the gum.

In accordance with the invention, the amount of polymer present in the final product may vary. However, for purposes of explanation herein, it is assumed that 100 parts by weight of polymer is combined with varying amounts of the other components, and the amount of polymer in the final product may thereby be inferred.

In the Examples below, the components for the polymer system include Component (B1), a vinyl-stopped gum of approximately 9000 D units in length having a penetration of about 300, and substantially no vinyl-on-chain. Component (C1) is a vinyl-on-chain, methyl-stopped gum of approximately 9000 D units in length having a penetration of about 300 and a vinyl content of about 0.2 weight percent. Other vinyl-on-chain gums include those which have a vinyl content of between about 0.05 and about 4 weight percent vinyl. Component (B2) is a vinyl-stopped gum of approximately 7000 D units in length having a penetration of about 800, and substantially no vinyl-on-chain. Component (A1) is a methyl chain stopped gum of approximately 9000 D units in length having a penetration of about 800 and substantially no vinyl-on-chain. Component (C2) is a methyl chain-stopped gum of approximately 8750 D units in length having a penetration of about 400 and about 0.6 weight percent vinyl.

Component (F) may be (1) an organopolysiloxane resin copolymer in an appropriate solvent (e.g. xylene). The resin copolymer may contain $R_3SiO_{\frac{1}{2}}$ monofunctional units (M units) and $SiO_2$ quadri-functional units (Q units), where each R is independently selected from the group consisting of vinyl radicals and monovalent hydrocarbon radicals free of aliphatic unsaturation. The ratio of M units to Q units ranges from about 0.5:1 to about 1.5:1, wherein about 0.5 to 10.0 weight percent are vinyl groups.

Alternatively, Component (F) may comprise (2) an organopolysiloxane resin copolymer containing M and Q units as aforesaid and $R_2SiO_{2/2}$ difunctional (D or D-vinyl units), in an appropriate solvent, where each R is independently selected from the group consisting of vinyl radicals and monovalent hydrocarbon radicals free of aliphatic unsaturation. The ratio of M units to Q units is from 0.5:1 to about 1.5:1 and the D or D-vinyl units are present in an amount of from about 1 to 70 mol percent based upon the total number of mols of siloxy units in the copolymer. The resinous copolymer contains from about 0.5 to about 10.0 weight percent vinyl groups. The organopolysiloxane resin copolymer of Component (F) may contain mixtures of the MQ and the M D-vinyl Q, resins.

The organopolysiloxane resin copolymers of Component (F) in the present composition and their manufacture are well known in the art. Such resins are usually produced by hydrolysis of chlorosilanes in a process described in U.S. Pat. No. 3,436,366 which is incorporated herein by reference.

Component (F) may be present in the composition of the present invention in an amount of up to about 30, preferably from 1.0 to 20 and more preferably from 4 to about 12 parts by weight based on the total weight of Components (A)-(D). Component (F) in the Examples below comprises (F2) dispersed in xylene. Much of the xylene has been vacuum stripped so as to result in a composition comprising 60% by weight solids and 40% by weight xylene.

Examples I and III below are compositions which contain a polymer system having Components (B1), (C1) and (F), including the xylene component, in amounts which total 100 parts by weight. The resin component makes up 6.3 percent by weight of the polymer system.

The process for manufacturing the compositions of Examples I and III includes a cook and strip step to facilitate the removal of the residual xylene from the finished compound.

Examples II and IV below are compositions which contain a polymer system having Components (A1), (B2) and (C2) in amounts which total 100 parts by weight. No resin component is used in Examples II and IV.

Component (H) comprises from about 5 to about 200, preferably from about 10 to about 100 and more preferably from about 20 to about 50 parts by weight of reinforcing fillers such as $SiO_2$ based on the polymer system, Components (A)-(D) and (F). Examples of reinforcing fillers that may be used include fumed silica and precipitated silica, with fumed silica being preferred. The filler (H) may be pretreated or treated in-situ with various agents, for example cyclopolysiloxanes as disclosed in U.S. Pat. No. 2,938,009 to Lucas and silazanes as disclosed in U.S. Pat. No. 3,635,743 to Smith. The cyclopoly-siloxanes may be, for example, a cyclotetramethyl siloxane present in the amount of about 15 to 20 weight percent of the filler (H).

Preferred fumed silica fillers may have a surface area of about 100 $m^2/g$ to about 300 $m^2/g$ and preferably about 160 $m^2/g$ to about 240 $m^2/g$. The higher surface area fillers tend to result in better properties, however, they are more expensive than the lower surface area fillers and require surface treatments or more processing aid to incorporate them into the gum. In the Examples below, the filler, Component (H), comprises a fumed silica filler having a surface area of about 160 $m^2/g$ which has been pretreated with octamethyl cyclotetrasiloxane.

A high vinyl-on-chain siloxane gum (I) may be added in an amount of up to about 100 parts by weight based on the polymer system, but may not be desired if, for example, much Component (D) is used. While Component (I) is similar, if not identical, to Component (D), it may be added in addition to the entire composition and thus not be considered in calculating the polymer system, Components (A)-(D). The actual amount of Component (I) to be added varies depending upon the vinyl content in Component (I), the amount of Component (D) and the amount of cross-linking desired. The amount of cross-linking can closely control the properties exhibited by the cured product.

The vinyl polymer or polymers of Component (I) contain vinyl-on-chain groups and/or vinyl end-groups. In preferred embodiments, Component (I) has the formula:

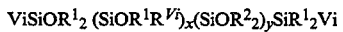

Wherein Vi is vinyl, $R^{Vi}$ is a vinyl radical having from 2 to about 10 carbon atoms, each $R^1$ is independently chosen from a vinyl radical having from 2 to about 10 carbon atoms, and a monovalent hydrocarbon radical, free of aliphatic unsaturation and containing 1 to about 8 carbon atoms, each $R^2$ is independently chosen from a vinyl radical having from 2 to about 10 carbon atoms, and a monovalent hydrocarbon radical, free of aliphatic unsaturation and containing 1 to about 8 carbon atoms, and x and y are integers, wherein x, y, $R^{Vi}$, $R^1$ and $R^2$ are chosen such that Component (I) has a weight percent vinyl concentration in the range from about $5 \times 10^{-3}$ to about 5 weight percent, preferably from about 0.01 to about 4, and more preferably from about 0.05 to about 4. The amount of Component (I) added to the blend may be increased when the vinyl concentration of Component (I) is low, and a lesser amount of Component (I) may be added when its vinyl concentration is high. For example, when using a vinyl-on-chain gum having a vinyl content of about 4 weight percent, only about 0.5 part by weight based on the polymer system is added. When using a gum having a vinyl content of about 0.2 to about 0.6 weight percent, about 5 parts by weight can be added based on the polymer system.

The vinyl-on-chain units of Component (I) provide increased cross-linking of the cured rubber and enhance those properties necessary for use in gasketing, sealing and vibration dampening applications.

The vinyl containing polymers of Component (I) can be made by a process well known in the art, for example, by reacting cyclotetrasiloxanes in the presence of low molecular weight, linear vinyl chain stoppers at high temperatures in the presence of basic catalysts so as to yield a polymer of the desired molecular weight. When the reaction is over, the catalyst is neutralized and the excess cyclics are vented off to result in the desired polymer. By controlling the amount of chain stopper and the temperature of the reaction, the molecular weight of the desired vinyl-containing polymer end product can be controlled. For more details of the process by which such vinyl containing polymers are produced, reference is made, for example, to U.S. Pat. No. 3,660,345, which is incorporated herein by reference. Component (I) is preferably a vinyl-on-chain diorganopolysiloxane or vinyl-on-chain diorganosiloxane blend.

In addition to the foregoing, Component (J) in the form of a hydride cross-linking agent may be employed. In a preferred embodiment, Component (J) may be a random copolymer formed of a polydimethyl siloxane (PDMS) and a polymethyl hydrogen siloxane (PMHS) having the form:

$R_3SiO(SiORHSiOR_2)_xSIR_3$ wherein each R is independently chosen from a hydrogen or monovalent hydrocarbon radical free of aliphatic unsaturation containing 1 to about 8 carbon atoms, and x ranges from about 2 to about 100. In the present invention, Component (J) is present in an amount ranging from about 0.1 to 10 parts by weight based on the polymer system, preferably 0.5 to 8, and more preferably 0.8 to 2.5 parts by weight. When a hydride agent is employed, a platinum catalyst may be substituted for the peroxide catalyst to cure the composition. In Component (J) x may vary so that (J) has a viscosity ranging from about 5 to 500 cps, preferably from about 10 to about 100 cps and more preferably from about 10 to 50 cps at 25° C.

The linear hydride described above can be made by many procedures which are known in the art and particularly by the hydrolysis of appropriate chlorosilanes. See for example, U.S. Pat. No. 4,041,101 which is incorporated herein by reference. In the Examples below, Component (J) has a viscosity of about 30 centistokes, a hydride content of about 0.8 percent by weight, and a chain length of about 100 units.

Component (K) is a vinyl terminated silazane coupling agent and surface treatment for the filler which may take the form:

$ViSiR_2NHSiR_2Vi$ wherein R is an organic such as $CH_3$. The coupling agent promotes bonding between gum components (A)–(D) of the polymer system and (H) and between the resin components (F) and (H), and may be applied to the reinforcing filler, Component (H), prior to mixing with the other components.

Component (K) may be vinyl stopped linear silazane such as tetramethyl-divinyl silazane. The material is added for enhancing the bonding of filler to polymer. In the present invention, the silazane also acts as a filler treatment in-situ.

Component (K) is preferably present in an amount of up to about 2 parts by weight, more preferably up to about 0.3 parts by weight based on the weight of the polymer system. Component (K) may be present in an amount of only about 0.03 parts by weight based on 100 parts of the polymer system, however, slightly higher amounts are preferred.

In addition to, in conjunction with, or in place of Component (K), small amounts of hexamethyl disilazane may be used to treat fumed silica filler prior to mixing the filler with the other components, or in-situ. If used, up to about 20 parts by weight of hexamethyl disilazane is added based on 100 parts of Component (H).

Other components may also be employed as discussed hereinafter. For example, in order to allow for easier incorporation of the filler in the polymer system, Component (L), a processing aid or plasticizer is employed. In the preferred embodiment, Component (L) is a low viscosity silanol or methoxy stopped siloxane fluid having a viscosity ranging from about 3–500 cps and preferably 3 to 50 cps at 25° C. The siloxane fluid is an equilibrium mix of low molecular weight oligomers of about 4 to about 10 D units, preferably between 4 and 6 repeating units in length with a minimum amount of cyclics in equilibrium with the oligomers. The processing aid (L) may have the form of $(R_2SiO_{\frac{1}{2}})_xOH$ or $(R_2SiO_{\frac{1}{2}})_xOR^1$ where each R is $CH_3$, each $R^1$ is an alkyl, and x is between 4 and 10, preferably between 4 and 6, with resulting cyclics of the same number of units in equilibrium. Di- and tri-alkoxy terminated siloxanes such as trimethoxy siloxane may also be used as process aids.

Component (L) may have the formula:

$R^3O(R_2SiO)_xR^3$ wherein each R is $CH_3$, and x is between 4 and 10 and preferably between 4 and 6, with resulting cyclics in the same number of units in equilibrium; and $R^3$ is selected from the group consisting of alkyl radicals having 1 to about 8 carbon atoms and hydrogen, with hydrogen being preferred.

In the present invention, the processing aid is present in amounts between 2 and 10 parts by weight based on the polymer system, preferably between 2.5 and 5.0 parts by weight and most preferably about 3.5 parts by weight based on the polymer system. It should be understood that typically the more filler that is used the greater amount of processing aid is employed. In the Examples below, Component (L) has a silanol content of about 7.5% by weight although a silanol content of about 5 to about 10 weight percent is expected to provide good results.

A small amount of water may also be added to increase the processibility of the blend. If used, only up to about 0.1 parts by weight water based on the polymer system is usually employed.

To improve the heat-age resistance of the cured compositions of the present invention, Component (M), a heat-age additive, may be employed. The heat aging component such as fumed $TiO_2$, iron octoate, $Ce(OH)_4$, or mixtures thereof, may be present in relatively small amounts, e.g., up to 2 parts by weight based upon the polymer system. In the examples below the heat aging Component (M) consists of 33 weight percent $TiO_2$, 5 weight percent iron octoate (12% iron in mineral spirits), 10 weight percent treated fumed silica (160 m²/g), and 50 weight percent of an 800 penetration vinyl-stopped, vinyl-on-chain gum.

Only up to about two parts by weight Component (M) is needed based on the polymer system to improve the heat-age characteristics of the composition. In the Examples below, 0.9 and 1.3 parts by weight of Component (M) are used based on the total weight of the other components.

An acid acceptor, such as MgO or ZnO, Component (N), may also be added in amounts from 0.5 to about 10 parts by weight based on the polymer system. This acid could otherwise cause cleavage of the product matrix. In the Examples below, 1.0 parts by weight of MgO masterbatch which comprises about 25% MgO in a methyl vinyl poly-siloxane is used for Component (N) based on the polymer system.

Other components which may be added to the blends of the present invention include, but are not limited to:

(O) a heat-age additive comprising cerium hydroxide, preferably about 75% by weight, masterbatched in polydimethylsiloxane fluid having a viscosity of about 30,000 cps at 25° C.

(P) which is a coloring agent comprising 57% carbon black dispersed in vinyl-polydimethyl siloxane fluid available as K8124 from Kenrich Petrochemicals, Bayonne, N.J.; and (Q) which is zinc oxide (ZnO) added as an amphoteric scavenger for improving resistance to lubricating oils.

In order to form a heat curable rubber, an organic peroxide, free radical initiator or curing catalyst is provided. The preferred peroxide curing agents are thermal decomposition organic peroxides conveniently used to cure silicone elastomers. Examples of suitable organic peroxide free radical initiators for use in the present invention are disclosed, for example, in U.S. Pat. No. 4,539,357 to Bobear which is incorporated herein by reference. Suitable peroxide catalysts include dialkyl peroxide such as di-tertiary-butyl peroxide, tertiary-butyl-triethylmethyl peroxide, di-tertiary-butyl-tertiary-triphenyl peroxide, t-butyl perbenzoate and a di-tertiary alkyl peroxide such as dicumyl peroxide. Under certain conditions hereinafter described, such as when a hydride is used, a platinum catalyst may be employed instead as an initiator. In the examples below, the preferred catalyst is a vinyl specific catalyst such as 2,5 dimethyl-2,5-di(t-butyl peroxy) hexane i.e., Lupersol ™ 101 available from Lucidol, Corp., Buffalo, N.Y., herein referred to as Component (R).

In the Examples below, Component (S) is the catalyst Lupersol ™ 101 in a masterbatch comprising 33% Lupersol ™ 101, 33% calcium carbonate and 33% dimethyl-siloxane oil having a viscosity of 30,000 centistokes.

Frequently used thermal decomposition catalysts activate within a temperature range of about 330° F. to about 390° F.

EXAMPLES

The following Examples shown below used components mixed in various proportions to produce heat curable silicone rubber compositions:

EXAMPLES I-IV

The Components (A)-(S) were mixed in various proportions to produce the compositions of Examples I-IV listed below in Table I. In each Example, Components (A)-(L) were mixed prior to adding the remaining components. The components are expressed in parts by weight.

TABLE I

| Component | Example I | Example II | Example III | Example IV |
|---|---|---|---|---|
| (B1) | 85 | — | 85 | — |
| (C1) | 5 | — | 5 | — |
| (B2) | — | 65 | — | 65 |
| (A1) | — | 20 | — | 20 |
| (C2) | — | 15 | — | 15 |
| (F) | 10 | — | 10 | — |
| (G) | 29.0 | 29.1 | — | — |
| (H) | 30 | 36 | 30 | 36 |
| (J) | 1.4 | 1.2 | 1.4 | 1.2 |

TABLE I-continued

| Component | Example I | Example II | Example III | Example IV |
|---|---|---|---|---|
| (K) | 0.12 | 0.06 | 0.12 | 0.06 |
| (L) | 3 | 3 | 3 | 3 |
| (M) | 0.9 | 1.3 | 0.9 | 1.3 |
| (N) | 1.4 | 2.6 | 1.4 | 2.6 |
| (O) | 0.9 | — | 0.9 | — |
| (P) | 0.4 | 0.72 | 0.4 | 0.72 |
| (Q) | 5.6 | — | 5.6 | — |
| (R) | — | 0.57 | — | 0.57 |
| (S) | 1.5 | — | 1.5 | — |

Table II below shows the properties of the compositions of Examples I-IV after adding all components and curing. All cure conditions were with a peroxide catalyst. The compositions of the Examples were molded at 350° F. for 15 minutes.

TABLE II

| Property | Example I | Example II | Example III | Example IV |
|---|---|---|---|---|
| Shore A | 59 | 54 | 49 | 46 |
| Tensile, psi | 1210 | 1047 | 1367 | 1424 |
| Elongation, % | 709 | 748 | 767 | 849 |
| Tear-B, ppi | 120 | 202 | 257 | 223 |
| sp. gravity | 1.291 | 1.252 | 1.170 | 1.170 |
| Comp. Set, % | 18.4 | 38.7 | 17.1 | 33.6 |

Test data were obtained from the following ASTM methods and procedures: Shore A—D-2240; Tensile, Elongation and Modulus—D-412 (Die C); Tear—D-624 (Die B); and Compression Set—D-395 (Method B 22 hrs @ 350° F.)

Table III shows the change in properties of the compositions of Examples I-IV after a 70 hour oil immersion at 300° F. in a 5W-30 motor oil per ASTM D-471.

TABLE III

| Property | Example I | Example II | Example III | Example IV |
|---|---|---|---|---|
| Shore A | −17 | −21 | −19 | −20 |
| Tensile % change | −27.3 | −30.2 | −51.1 | −56.5 |
| Elongation % change | −10.0 | −18.1 | −34.9 | −41.0 |
| Weight % change | 20.5 | 22.7 | 25.4 | 29.3 |
| Volume % change | 30.8 | 32.0 | 34.9 | 38.6 |

Table IV below shows the change in properties of the compositions of Example I-IV after immersion in ASTM reference oil #3 for 70 hours at 300° F. per ASTM test method D-471.

TABLE IV

| Property | Example I | Example II | Example III | Example IV |
|---|---|---|---|---|
| Shore A | −19 | −23 | −19 | −14 |
| Tensile % change | −35.4 | −36.1 | −63.6 | −72.7 |
| Elongation % change | −23.1 | −26.1 | −53.5 | −33.0 |
| Weight % change | 27.6 | 29.8 | 36.7 | 39.8 |
| Volume % change | 39.2 | 42.5 | 47.4 | 49.0 |

The compositions of Examples I and II exhibit enhanced properties which make them useful for many automotive gasketing applications. As can be seen in Table III, losses in tensile strength and elongation are significantly improved and volume swell and weight changes are significantly decreased in the compositions containing the potassium aluminosilicate filler after oil immersion testing of the compositions. The observed trend is an improvement in shrinkage resistance and heat age and oil immersion resistance by the inclusion of Component (G).

Although the present invention has been described in connection with preferred embodiments, it will be appreciated by those skilled in the art that additions, modifications, substitutions and deletions not specifically described may be made without departing from the spirit and scope of the invention defined in the appended claims.

What is claimed is:

1. A heat curable silicone rubber composition comprising a polymer system, said polymer system containing:

(A) up to 100 parts by weight of an organopolysiloxane having a viscosity of about 3,000,000 to about 100,000,000 cps at 25° C. and substantially no vinyl, or mixtures of such organopolysiloxanes;

(B) up to 100 parts by weight of a vinyl-stopped organopolysiloxane, substantially free to vinyl-on-chain, having a viscosity of about 3,000,000 to about 100,000,000 cps at 25° C., or mixtures of such organopolysiloxanes;

(C) up to 100 parts by weight of a vinyl-on-chain organopolysiloxane, free of vinyl end stops, having a vinyl content of about $5 \times 10^{-3}$ to about 5 weight percent and a viscosity of about 3,000,000 to about 100,000,000 cps at 25° C., or mixtures of such organopolysiloxanes;

(D) up to 100 parts of a vinyl-stopped, vinyl-on-chain organopolysiloxane having a vinyl content of about $5 \times 10^{-3}$ to about 5 weight percent, or mixtures of such organopolysiloxanes;

(F) up to about 30 parts by weight based upon 100 parts of the total of Components (A)–(D) of an organopolysiloxane resin copolymer comprising:

1) $R_3SiO_{\frac{1}{2}}$ units (M units) and $SiO_2$ units (Q units) where each R is independently selected from the group consisting of vinyl radicals and monovalent hydrocarbon radicals free to aliphatic unsaturation with a ratio of M units to Q units ranging from 0.5:1 to about 1.5:1, where the copolymer contains from about 0.5 to 10 weight percent vinyl groups, or 2) $R_3SiO_{\frac{1}{2}}$ units (M units), $SiO_2$ units (Q units) and $R^{Vi}{}_2SiO_{2/2}$ units (D vinyl units) where each R is as defined above and each $R^{Vi}$ is a vinyl containing radical having from 2 to about 10 carbon atoms, and where the ratio of M units to Q units is from 0.5:1 to about 1.5:1, and the D vinyl units are present in an amount of from about 1 to about 70 mol percent based upon the total number of mols of siloxy units in the copolymer, and where the resinous copolymer contains from about 0.5 to about 10.0 weight percent vinyl groups, or 3) mixtures of 1 and 2; such that the total of Components (A)–(D) and (F) equals 100 parts by weight, said silicone rubber composition further comprising:

(G) from about 1 to about 50 parts by weight potassium aluminosilicate filler having a surface area of between about 5.0 and about 6.50 m²/g, an average particle diameter of between about 1.0 and about 20.0 micrometers and an average particle thickness of between about 0.45 and 1.0 micrometers;

(H) up to about 200 parts by weight based upon the polymer system of a finely divided filler; and (J) from about 0.1 to about 10 parts by weight based upon the polymer system of a hydride cross-linking agent.

2. The heat curable silicone rubber composition of claim 1, wherein Component (G) is present in an amount of between about 10 and about 40 parts by weight.

3. The heat curable silicone rubber composition of claim 1, wherein Component (G) is present in an amount of between about 15 and about 30 parts by weight.

4. The heat curable silicone rubber composition of claim 1, wherein Component (G) has a surface area of from about 5.05 to about 6.2 m²/g.

5. The heat curable silicone rubber composition of claim 1, wherein Component (G) has a surface area of from about 5.07 to about 6.11 m²/g.

6. The heat curable silicone rubber composition of claim 1, wherein Component (G) has an average particle diameter of from about 1.0 to about 10 micrometers.

7. The heat curable silicone rubber composition of claim 1, wherein Component (G) has an average particle diameter of from about 1.0 to about 5.0 micrometers.

8. The heat curable silicone rubber composition of claim 1, wherein Component (G) has an average particle thickness of from about 0.5 to about 0.8 micrometers.

9. The heat curable silicone rubber composition of claim 1, wherein Component (G) has an average particle thickness of from about 0.45 to about 0.55 micrometers.

10. The heat cured silicone rubber composition of claim 1, wherein Component (B) has the structure:

$$ViSiOR^1{}_2(SiOR^1{}_2)_x(SiOR^2{}_2)_ySiR^1{}_2Vi;$$

wherein Vi is vinyl and each $R^1$ is independently chosen from monovalent hydrocarbon radicals free of aliphatic unsaturation and containing 1 to about 8 carbon atoms;

each $R^2$ is independently chosen from monovalent hydrocarbon radicals containing 1 to about 8 carbon atoms, and x and y are integers chosen such that the viscosity is about 3,000,000 to about 100,000,000 cps at 25° C.

11. The heat curable silicone rubber composition of claim 1, wherein Component (D) has the formula:

$$ViSiOR^1{}_2(SiOR^1R^{Vi})_x(SiOR^2{}_2)_ySiOR^1{}_2Vi$$

wherein Vi is vinyl, $R^{Vi}$ is a vinyl radical having from 2 to about 10 carbon atoms, each $R^1$ is independently chosen from a vinyl radical having from 2 to about 10 carbon atoms, and a monovalent hydrocarbon radical free of aliphatic unsaturation and containing 1 to about 8 carbon atoms, each $R^2$ is independently chosen from a vinyl radical having from 2 to about 10 carbon atoms and a monovalent hydrocarbon radical free of aliphatic unsaturation and containing 1 to about 8 carbon atoms, and x and y are integers, wherein x, y, $R^{Vi}$, $R^1$ and $R^2$ are chosen such that Component (D) has a weight percent vinyl concentration in the range from about 0.001 to about 5 weight percent.

12. The heat curable silicone rubber composition of claim 1, further comprising:
   (K) up to about 2 parts by weight of a tetramethyldivinyl silazane based on 100 parts by weight of the polymer system.

13. The heat curable silicone rubber composition of claim 1, further comprising:
   (L) up to about 10 parts by weight based upon the polymer system of a silanol stopped siloxane fluid having a viscosity of about 3 to about 500 cps at 25° C.

14. The heat curable silicone rubber composition of claim 1, wherein said filler, Component (H), is treated with up to about 20 parts by weight, based on 100 parts by weight of Component (H), of cyclic ethyl tetramer.

15. The heat curable silicone rubber composition of claim 3, wherein Component (D) has a vinyl content of about 0.001 weight percent or higher and is present in an amount of between about 0.1 and about 100 percent of the polymer system.

16. The heat curable silicone rubber composition of claim 1, wherein Component (J), is an organohydrogensiloxane cross-linking agent having a hydride content of about 0.8 percent by weight.

17. The heat curable silicone rubber composition of claim 1, wherein Component (J) has the formula:

$$R_3SiO(SiORHSiOR_2)_xSiR_3$$

wherein each R is independently chosen from a hydrogen or monovalent hydrocarbon radical free of aliphatic unsaturation containing 1 to about 8 carbon atoms, and x varies so that (J) has a viscosity ranging from about 5 to 500 cps at 25° C.

18. The heat curable silicone rubber composition of claim 1, further comprising Component (M) up to about 2 parts by weight based upon the polymer system of a heat-age additive.

19. The heat curable silicone rubber composition of claim 1, further comprising Component (N), up to about 10 parts based on the polymer system of an acid acceptor.

20. The heat curable silicone rubber composition of claim 1, wherein the filler (H) has a surface area of between about 160 and about 240 $m^2/g$.

21. A heat curable silicone rubber gasket comprising a polymer system, said polymer system containing:
   (A) up to 100 parts by weight of an organopolysiloxane having a viscosity of about 3,000,000 to about 100,000,000 cps at 25° C. and substantially no vinyl, or mixtures of such organopolysiloxanes;
   (B) up to 100 parts by weight of a vinyl-stopped organopolysiloxane, substantially free of vinyl-on-chain, having a viscosity of about 3,000,000 to about 100,000,000 cps at 25° C., or mixtures of such organopolysiloxanes;
   (C) up to 100 parts by weight of a vinyl-on-chain organopolysiloxane, free of vinyl end stops, having a vinyl content of about $5 \times 10^{-3}$ to about 5 weight percent and a viscosity of about 3,000,000 to about 100,000,000 cps at 25° C., or mixtures of such organopolysiloxanes;
   (D) up to 100 parts of a vinyl-stopped, vinyl-on-chain organopolysiloxane having a vinyl content of about $5 \times 10^{-3}$ to about 5 weight percent, or mixtures of such organopolysiloxanes;
   (F) up to about 30 parts by weight based on 100 parts of the total of Components (A)–(D) of an organopolysiloxane resin copolymer comprising:
      1) $R_3SiO_{\frac{1}{2}}$ units (M units) and $SiO_2$ units (Q units) where each R is independently selected from the group consisting of vinyl radicals and monovalent hydrocarbon radicals free of aliphatic unsaturation with a ratio of M units to Q units ranging from 0.5:1 to about 1.5:1, where the copolymer contains from about 0.5 to 10 weight percent vinyl groups, or
      2) $R_3SiO_{\frac{1}{2}}$ units (M units), $SiO_2$ units (Q units) and $R^{Vi}{}_2SiO_{2/2}$ units (D vinyl units) where each R is as defined above and each $R^{Vi}$ is a vinyl containing radical having from 2 to about 10 carbon atoms, and where the ratio of M units to Q units is from 0.5:1 to about 1.5:1, and the D vinyl units are present in an amount of from about 1 to about 70 mol percent based upon the total number of mols of siloxy units in the copolymer, and where the resinous copolymer contains from about 0.5 to about 10.0 weight percent vinyl groups, or
      3) mixtures of 1 and 2; such that the total of Components (A)–(D) and (F) equals 100 parts by weight, said silicone rubber composition further comprising:
   (G) from about 1 to about 50 parts by weight potassium aluminosilicate filler having a surface area of between about 5.0 and about 6.50 $m^2/g$, an average particle diameter of between about 1.0 and about 20.0 micrometers and an average particle thickness of between about 0.5 and 1.0 micrometers;
   (H) up to about 200 parts by weight based upon the polymer system of a finely divided filler; and
   (J) from about 0.1 to about 10 parts by weight based upon the polymer system of a hydride cross-linking agent.

22. The heat curable silicone rubber gasket of claim 21, wherein Component (G) has a surface area of from about 5.05 to about 6.2 $m^2/g$.

23. The heat curable silicone rubber gasket of claim 21, wherein Component (G) has a surface area of from about 5.07 to about 6.11 $m^2/g$.

24. The heat curable silicone rubber gasket of claim 21, wherein Component (G) has an average particle diameter of from about 1.0 to about 10 micrometers.

25. The heat curable silicone rubber gasket of claim 24, wherein Component (G) has an average particle diameter of from about 1.0 to about 5.0 micrometers.

26. The heat curable silicone rubber gasket of claim 24, wherein Component (G) has an average particle thickness of from about 0.5 to about 0.8 micrometers.

27. The heat curable silicone rubber gasket of claim 24, wherein Component (G) has an average particle thickness of from about 0.45 to about 0.55 micrometers.

28. A method of improving oil resistance in a heat curable silicone rubber composition, said silicone rubber composition comprising a polymer system, said polymer system containing:
   (A) up to 100 parts by weight of an organopolysiloxane having a viscosity of about 3,000,000 to about 100,000,000 cps at 25° C. and substantially no vinyl, or mixtures of such organopolysiloxanes;
   (B) up to 100 parts by weight of a vinyl-stopped organopolysiloxane, substantially free of vinyl-on-chain, having a viscosity of about 3,000,000 to about 100,000,000 cps at 25° C., or mixtures of such organopolysiloxanes;

(C) up to 100 parts by weight of a vinyl-on-chain organopolysiloxane, free of vinyl end stops, having a vinyl content of about $5 \times 10^{-3}$ to about 5 weight percent and a viscosity of about 3,000,000 to about 100,000,000 cps at 25° C., or mixtures of such organopolysiloxanes;

(D) up to 100 parts of a vinyl-stopped, vinyl-on-chain organopolysiloxane having a vinyl content of about $5 \times 10^{-3}$ to about 5 weight percent, or mixtures of such organopolysiloxanes;

(F) up to about 30 parts by weight based upon 100 parts of the total of Components (A)–(D) of an organopolysiloxane resin copolymer comprising:

1) $R_3SiO_{\frac{1}{2}}$ units (M units) and $SiO_2$ units (Q units) where each R is independently selected from the group consisting of vinyl radicals and monovalent hydrocarbon radicals free to aliphatic unsaturation with a ratio of M units to Q units ranging from 0.5:1 to about 1.5:1, where the copolymer contains from about 0.5 to 10 weight percent vinyl groups, or 2) $R_3SiO_{\frac{1}{2}}$ units (M units), $SiO_2$ units (Q units) and $R^{Vi}{}_2SiO_{2/2}$ units (D vinyl units) where each R is as defined above and each $R^{Vi}$ is a vinyl containing radical having from 2 to about 10 carbon atoms, and where the ratio of M units to Q units is from 0.5:1 to about 1.5:1, and the D vinyl units are present in an amount of from about 1 to about 70 mol percent based upon the total number of mols of siloxy units in the copolymer, and where the resinous copolymer contains from about 0.5 to about 10.0 weight percent vinyl groups, or 3) mixtures of 1 and 2; such that the total of Components (A)–(D) and (F) equals 100 parts by weight, said silicone rubber composition further comprising:

(H) up to about 200 parts by weight based upon the polymer system of a finely divided filler; and (J) from about 0.1 to about 10 parts by weight based upon the polymer system of a hydride cross-linking agent, said method comprising mixing with said silicone rubber composition (G) from about 1 to about 50 parts by weight potassium aluminosilicate filler having a surface area of between about 5.0 and about 6.50 m$^2$/g, an average particle diameter of between about 1.0 and about 20.0 micrometers and an average particle thickness of between about 0.5 and 1.0 micrometers.

29. A method as defined in claim 28, further comprising adding a catalytic amount of a curing catalyst to said composition and curing said composition.

* * * * *